United States Patent [19]
Hargett, Jr.

[11] Patent Number: 4,576,769
[45] Date of Patent: Mar. 18, 1986

[54] PROCESS FOR EXTRUDING AND SIZING FOAMED THERMOPLASTIC CIGARETTE FILTER RODS

[75] Inventor: Wyatt P. Hargett, Jr., Matthews, N.C.

[73] Assignee: Celanese Corporation, New York, N.Y.

[21] Appl. No.: 594,635

[22] Filed: Mar. 29, 1984

[51] Int. Cl.[4] .................. B29C 67/22; B29C 59/04
[52] U.S. Cl. .................. 264/51; 131/345; 264/321; 264/DIG. 66; 425/308; 425/325; 425/328; 425/374; 425/392; 425/402; 425/817 R
[58] Field of Search ............. 264/321, DIG. 66, 53; 425/374, 392, 383, 308, 817 R, 328, 337, 402, 325; 131/345

[56] References Cited

U.S. PATENT DOCUMENTS

| | | | |
|---|---|---|---|
| 653,687 | 7/1900 | Middleditch | 425/374 X |
| 1,163,626 | 12/1915 | Allison | 425/374 X |
| 1,189,868 | 7/1916 | Reed | 425/374 |
| 1,542,833 | 6/1925 | Parsons et al. | 425/374 X |
| 1,641,781 | 9/1927 | Parsons | 425/374 X |
| 2,582,491 | 1/1952 | Larsen et al. | 425/374 |
| 2,719,324 | 10/1955 | Gray et al. | 264/DIG. 66 |
| 3,813,200 | 5/1974 | Gergely | 425/140 |
| 3,939,849 | 2/1976 | Baxter et al. | 264/53 X |
| 4,006,209 | 2/1977 | Chiselko et al. | 264/211 |
| 4,054,550 | 10/1977 | Parker et al. | 264/53 X |
| 4,149,546 | 4/1979 | Luke et al. | 425/392 X |
| 4,180,536 | 12/1979 | Howell, Jr. et al. | 264/53 |
| 4,232,130 | 11/1980 | Baxter et al. | 264/53 X |
| 4,436,517 | 3/1984 | Lebet | 425/392 X |

FOREIGN PATENT DOCUMENTS

| | | | |
|---|---|---|---|
| 518299 | 2/1931 | Fed. Rep. of Germany | 425/374 |
| 580577 | 7/1933 | Fed. Rep. of Germany | 425/374 |
| 519640 | 4/1940 | United Kingdom | 425/374 |
| 1341400 | 12/1973 | United Kingdom | |

*Primary Examiner*—Philip Anderson
*Attorney, Agent, or Firm*—Robert J. Blanke

[57] ABSTRACT

A method of sizing thermoplastic foamed cigarette filter rods and apparatus therefore. The apparatus comprises a rotating drum member having a plurality of stationary heated block members mounted about the periphery thereof. The block members are positioned such that a specific gap is created through which the thermoplastic polymeric filter rods are rolled and compressed to a uniform circumference.

7 Claims, 4 Drawing Figures

PROCESS FOR EXTRUDING AND SIZING FOAMED THERMOPLASTIC CIGARETTE FILTER RODS

This invention relates to the sizing of cigarette filter rods and more specifically, to a process and apparatus for the sizing of thermoplastic foamed cigarette filter rods.

While cigarette filter rods prepared from cellulose acetate filamentary material make up the bulk of the worldwide usage of cigarette filters, thermoplastic polymer cigarette filters have recently been introduced, principally in the form of either foamed cellulose acetate filters or polyolefin foamed filters. Polyolefin foamed filters are disclosed in U.S. Pat. Nos. 3,939,849 and 4,054,550. The patented filters are characterized as being an open cell reticular structure wherein individual cells are bridged by fiber like elements. Foamed cellulose acetate cigarette filters are disclosed in U.S. Pat. No. 4,180,536 wherein the cellulose acetate cigarette filter is characterized as being an interconnected expanded cellular foam, at least some of the cells being further characterized by the presence of fibrils bridging the cell walls, the entire structure having a high ratio of membranous cell walls to fibrils. Regardless of the polymeric material employed in the preparation of foamed filter rods, the method of producing these rods involves extrusion through a circular orifice. Because it is difficult to control rod diameter in such extrusion processes, these rods are extruded in oversized form and subsequently sized to the desired circumference.

As set forth in British Pat. No. 1,341,400, after extrusion a foamed strand is conveyed away from the die. To control the diameter of the extruded strand, the extruded strand is passed through a sizing tube and thereafter cooled. The cooling treatment preferably comprises passing the strand through another tube that is cooled. Preferably, the cooling tube has a cross-section substantially the same as that of the sized rod so that contact between the surface of the rod and the walls of the channel is made and heat is withdrawn from the rod surface. The sizing and cooling tubes preferably having highly polished interior surfaces, and for example, final adjustments in their size is conveniently done by honing. Each tube should preferably have a diameter at its exit end substantially the same as that desired in the foamed resin rod (and accordingly in the final cigarette filter), although the exit end of the sizing tube can be slightly smaller because a small amount of expansion takes place after the rods leave this tube, the inlet end of each tube can be slightly larger than the rod. Preferably, each tube is constructed so that it can be readily split longitudinally and reassembled to assist in threading the foamed rod through it on start up. While tubular sizing processes and apparatus can with sufficient quality control provide an acceptable end product, the process has certain deficiencies. More specifically, if for any reason the extrudate should leave the extruding means at an outside dimension, that is at a dimension greater than intended either by way of the overall work piece diameter at any given location, it is possible for the outsized extrudate upon entry through the aperture of the sizing device to jam the same. This can result in shutdown of the forming line apparatus as well as requiring the aperture to be freed. Inasmuch as the extrudate is usually in a semi-plastic state, the extrudate can solidify in the aperture making its removal time consuming and difficult. Accordingly, it is desirable to employ a process and apparatus for use in connection with the extrusion of a thermoplastic foamed filter rod which functions to size the filter rod without jamming.

In U.S. Pat. No. 3,813,200, apparatus is disclosed for cutting an outsized extrudate prior to entry into a sizing device, thus preventing possible jamming of the sizing device. The apparatus includes a cutter blade mounted adjacent the sizing aperture and slidably movable between first and second operative positions, the cutter blade during its movement from first to second operative positions sliding through a course passing adjacent said closing aperture so that the cutter blade will sever the extrudate at the aperture. To detect the presence of any outsized extrudate issuing from the extruder unit, a photoelectric cell detection unit is provided in close proximity to the closing aperture. The photoelectric cell unit includes a light beam projector disposed such as to project a beam to a suitably positioned photoelectric cell in a beam path passing adjacent the travel course of the extrudate during its passage to the sizing aperture. If the extrudate is outsized from a desired predetermined dimension beyond certain allowable limits, the outsized extrudate will interrupt the light beam. Interruption of the light beam in turn will cause the operation through appropriate electrical control circuitry of a power operated device connected with the cutter blade to move the cutter blade from its first to second operative position. Additionally and concurrently, the sizing aperture is closed off by the cutter blade when the latter has moved to its second operative position. While this apparatus is a major improvement, its use requires waste of a certain amount of extrudate and lost time while the sizing equipment is not in operation.

It is therefore an object of this invention to provide a process for sizing thermoplastic foam rod extrudates wherein shutdown of the forming line apparatus is eliminated.

It is another object of this invention to provide apparatus for sizing thermoplastic foam extrudates wherein wastes due to easily plugged tubular sizing devices are eliminated.

These and other objects will become more apparent from the following description of the invention.

In accordance with this invention, it has now been discovered that oversized thermoplastic foam rods may be cut to conventional cigarette filter rod length and then fed to a device consisting of a rotating drum and a plurality of adjustable stationary heated block members mounted about the peripherie of the drum such that a specific gap is created through which the oversized rods are rolled thereby compressing the rods to a uniform circumference upon exiting the device. Preferably, the heated block members having a total circumferential arc length of from 90° to 150° are heated by means of electrical resistance heat to temperatures in the range of from 140° to 210° C. for cellulose acetate and 120° to 170° C. for polypropylene at rod residence times of from 0.5 to 1.5 seconds. Preferably, drum speeds of from 10 to 40 revolutions per minute are employed. Most preferably, the rods fed to the sizing apparatus of this invention are pre-sized in a garniture belt which wraps about the rod and compresses the rod prior to the rod being cut to lengths of from 50 mm to 140 mm for final sizing in the apparatus of this invention.

The conveying means for conveying the filter rods may be a hopper or preferably a continuous belt and rotatable filter rod alignment drum. Generally, such drums are used in rod transfer machines for delivering a series of filter rods via one or more storage drums to a filter attaching assembly of a cigarette making machine.

A better understanding of the invention may be had from the following description of the drawings wherein.

Figure 1:
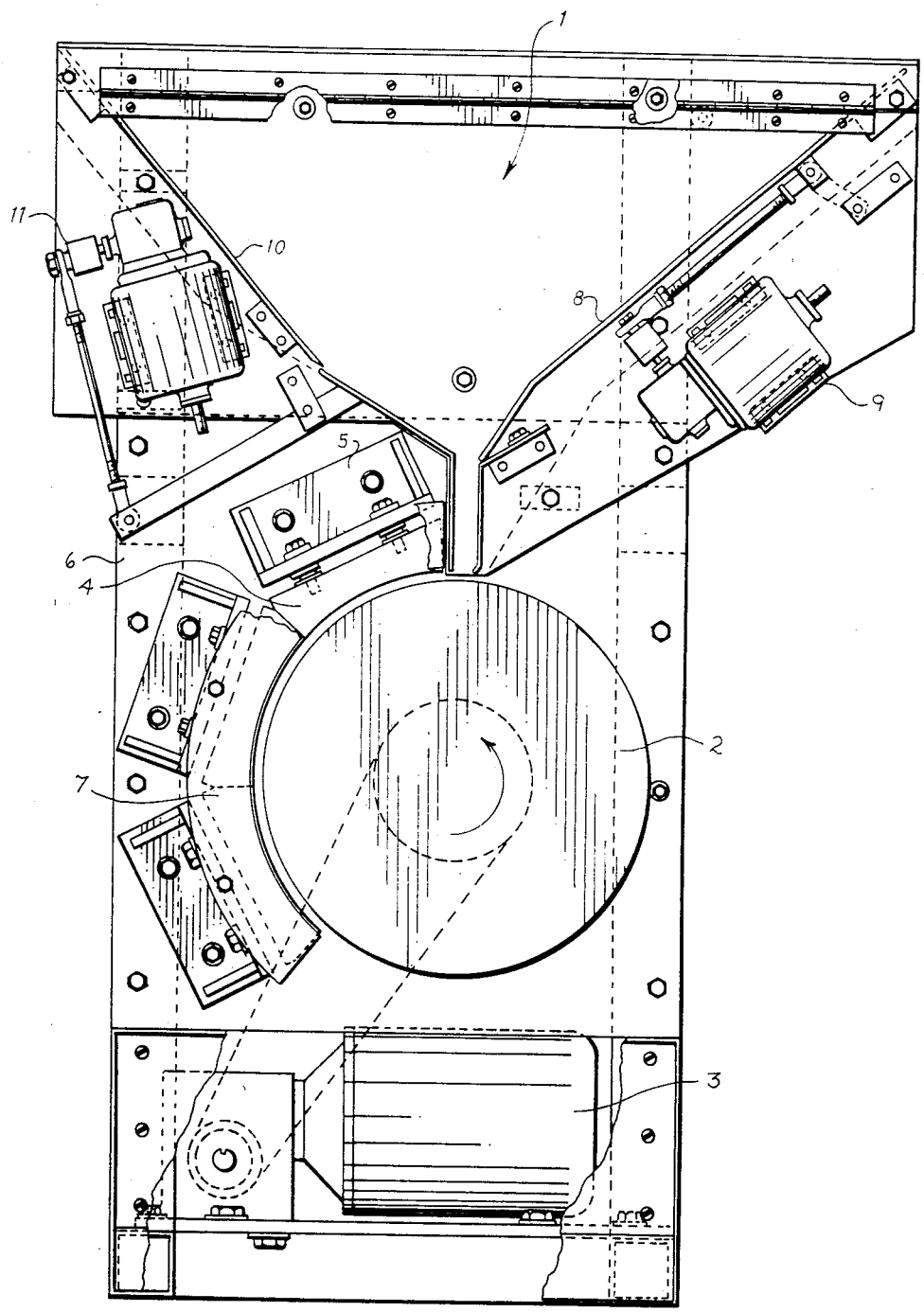
FIG. 1 illustrates a side view of the filter rod sizing apparatus.

Turning to FIG. 1 of the drawings, rod members 1 which are cut sections of foam filter extrudates prepared by process such as that described in U.S. Pat. No. 4,180,536 are fed from a hopper 1 onto rotating drum member 2. Rotating drum member 2, which is belt driven by an electric motor 3, forwards rod members into a nip of preselected dimensions caused by positioning heated block members 4 about the peripherie of drum member 2.

Heated block members 4 are adjustably secured to bracket members 5 which in turn are secured to frame member 6. As a safety member, a guard plate 7 is secured to bracket member 5 and shields all of heated block members 5 to prevent accidental contact by an operator. Hopper member 1 has parallel vertical front and back walls and a first inclined side wall 8 which is driven in an oscillatory motion by an electric motor 9. A second side wall member 10 is also driven in an oscillatory motion by a second electric motor 11 whereby jamming of filter rod members within the hopper 1 is prevented.

Figure 2:
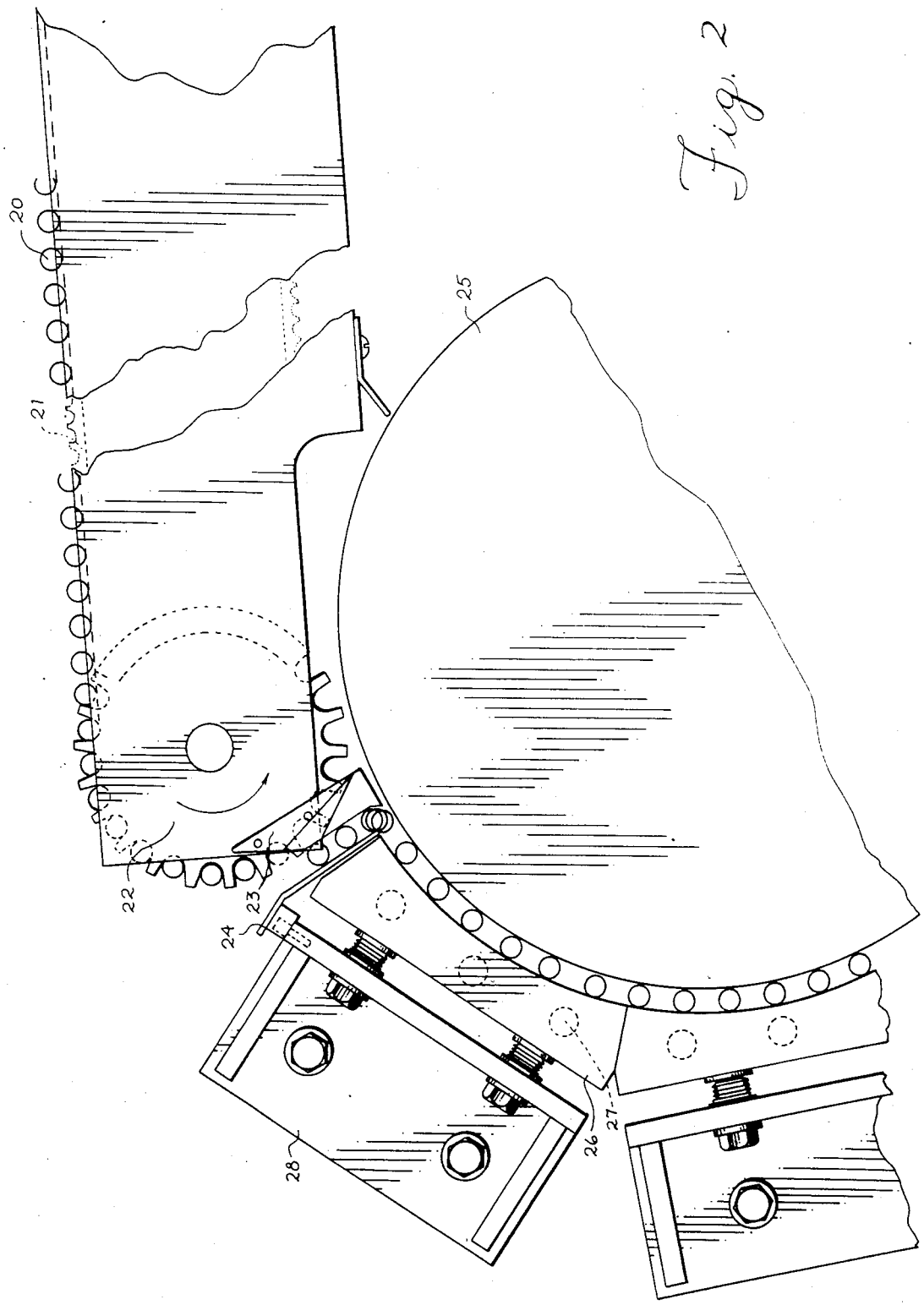
FIG. 2 illustrates a side view of the preferred rod feed apparatus.
Figure 3:
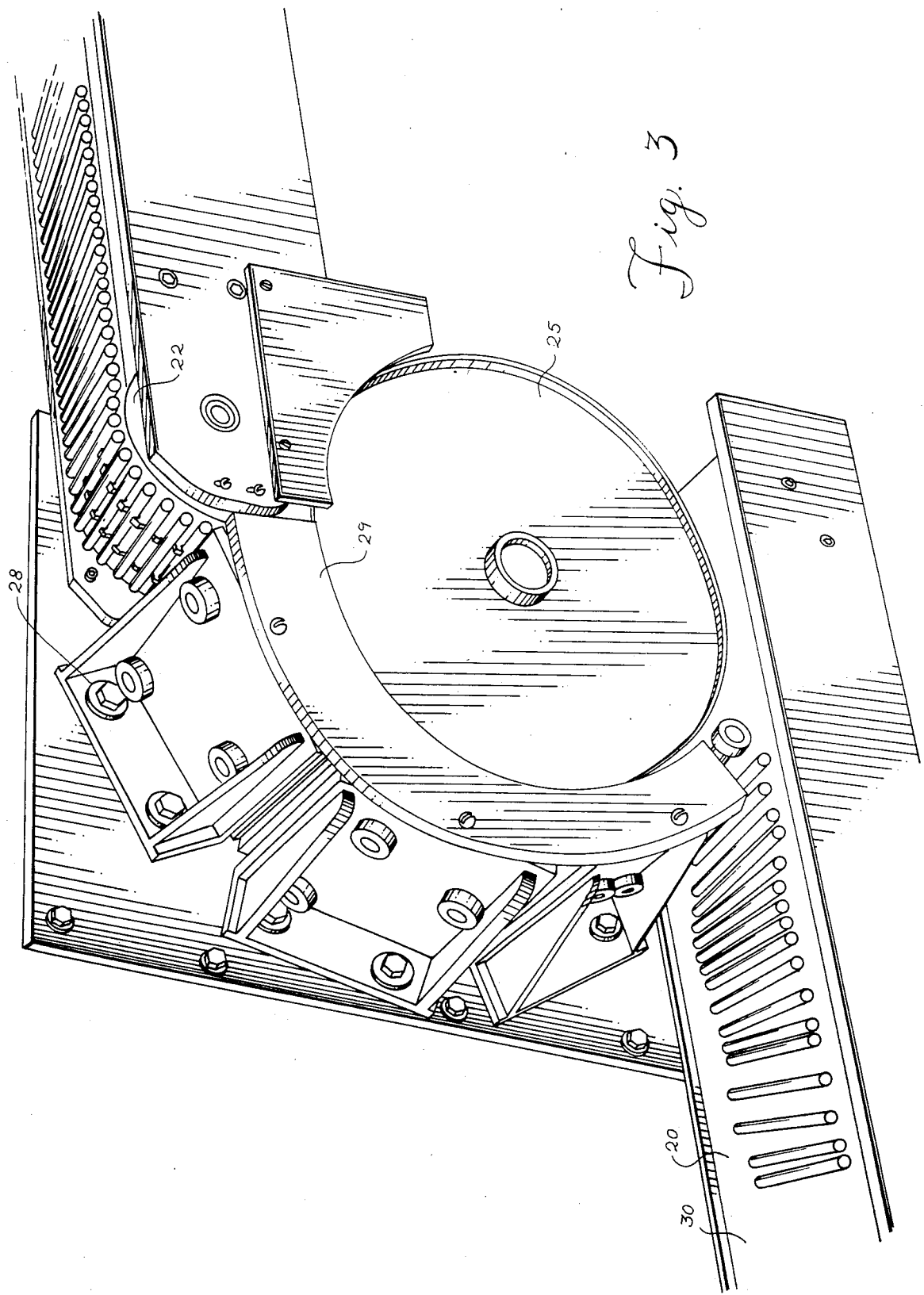
FIG. 3 is a projected view of the filter rod sizing apparatus employing the preferred rod feed apparatus.
Figure 4:
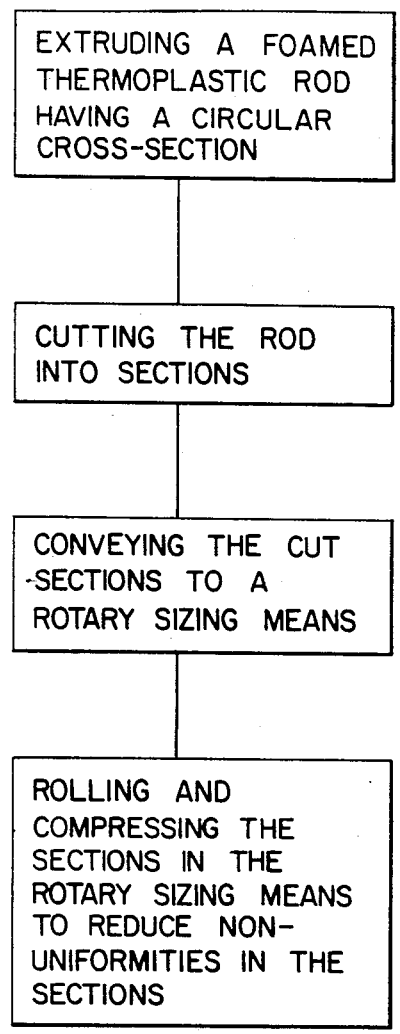
FIG. 4 illustrates a flow diagram of the process to produce the filter rod.

Preferably, the sizing device of the instant invention is fed by means of a conveyor belt assembly which is illustrated in FIGS. 2 and 3 of the drawings. As can be seen in FIG. 2, filter rods 20 are conveyed by means of right and left hand denticulated belt members 21 which is driven by a drive roll, not illustrated, and which pass about idler roll 22 which is also equipped with right and left denticulations, the denticulations of idler roll 22 being aligned with the denticulations of belt members 21 which may be a belt such as a timing belt. Filter rods issuing from idler roll member 22 drop into the passageway formed by adjustable gate member 23 and fixed plate member 24. Rod members 20 then are caused to be sized by passage between the nip formed by rotating drum member 25 and heated sizing block members 26. Heated sizing block members 26 have electric heating elements 27 disposed therein. The heating elements are preferably electric cartridge heaters such as the 425 watt cartridge heater, Model No. SC506, manufactured by Hot Watt, Inc., 128 Maple Street, Danvers, Mass. 01923, the cartridge heater being six inches in length and one half inch in diameter Heated block members 26 are adjustably mounted to bracket member 28 whereby the sizing nip between heated block members 26 and drum member 25 may be adjusted.

Preferably a guard member 29, as can be seen in FIG. 3 of the drawings, is secured to bracket members 28 so as to prevent inadvertent operator contact with the heated block members. On exiting the nip between heated block members 26 and drum member 25, the sized rod members 20 are deposited on conveyor belt member 30.

Utilizing the apparatus of this invention, it has been found that supply rods with a nominal 25.5 millimeter circumference (approximately 1 to 1.5 percent coefficient of variation) can be sized to 24.8 millimeter average circumference with a 0.3 to 0.4 percent coefficient of variation. The statistical investigation of the improvement obtained by the use of the sizing apparatus and process of the instant invention is based on F-distribution. In F-distribution, when samples are taken from two independent populations, their variances are also independent and both $S_1^2$ and $S_2^2$ are unbiased estimators of the population variances, if the populations are infinite or if sampling with replacement. That is to say $S_1^2$ is an unbiased estimator of $\sigma_1^2$ (population standard deviation 1) and $S_2^2$ is an unbiased estimator of $\sigma_2^2$ (population standard deviation 2). The ratio of $\sigma_1^2$ to $\sigma_1^2$ is equal to 1.00 if the two variances are equal, and the mean ratio of $S_1^2$ to $S_2^2$ is also equal to 1.00 if the population variances are equal. If the two populations are both normal and have equal variances, then the ratio of the two sample variance values are distributed as F with $n_1 - 1$ and $n_2 - 1$ degrees of freedom. For purposes of this invention, the term "coefficient of variation" (CV) is a means for comparing the dispersion of two series by expressing the standard deviation as a percent of the mean of the series. In the instant invention, the mean of the series is a value encompassing 66% of all samples. The coefficient of variation (CV) may then be defined as follows:

$$CV = \frac{\text{average sample deviation}}{\text{average sample value}} \times 100$$

The following specific examples are given for purposes of illustration and should not be considered as limiting the spirit or scope of this invention:

EXAMPLE 1

A cellulose acetate foam filter rod is prepared substantially according to the teachings of Example 1 of U.S. Pat. No. 4,180,536 with the exception that the solidified rod is not pulled through a shaping and sizing device. After exiting the one meter long hot air chamber (zone 6), the rod is passed into a garniture type belt which wraps around the rod and compresses it as the rod is being passed to a cutter and cut into 120 millimeter lengths. The cut rods are then fed into the hopper of FIG. 1 of the drawings, wherein the circumference of the drum member is ½ meter and is driven at 14 revolutions per minute so as to provide a surface speed of 7 meters per minute. The effective length of the heated shoe members is 140 millimeters whereby a rod residence time in the nip between the heated shoe or rolling block and the driven drum is about 1.2 seconds. The heating elements were maintained at a temperature of 160° C. and for a 100 rod trial, the average circumference before sizing was found to be 25.46 millimeters with an average coefficient of variation of 1.8% while after sizing, the average circumference was reduced to 24.85 millimeters with an average coefficient of variation of 0.55%.

EXAMPLE 2

A cellulose acetate foam filter rod is prepared substantially according to the teachings of Example 1 of U.S. Pat. No. 4,180,536 with the exception that exiting the one meter long hot air chamber (zone 6) is passed into a garniture type belt which wraps around the rod and compresses it as it pushes the rod through a heated bore. The presized rods are then passed to a cutter assembly consisting of a Molins Mark VI rod maker bed having a modified mark VI head marketed by Molins, Ltd., Evelyn Street, London S.E.8, 5CH England Cutter drive gearing is employed such as to produce rod lengths of 120 millimeters. The cutter speed is also synchronized to the extruder speed. The cut rods are transported from the cutter to the sizing device as illustrated in FIG. 2 of the drawings by means of a browning timing belt conveyor. The apparatus employs a drum one meter in circumference having heated block members throughout a 60° arc extending for 394 millimeters about the peripherie of the drum. The heated block members were maintained at a temperature of 160° C. and the speed of the one meter circumference drum member adjusted so as to achieve a linear speed of 81 feet per minute which is found to process approximately 600 rods per minute. The result of a 100 rod trial are found to be as follows:

| Circumference | average per 100 rods | population standard deviation | coefficient of variation |
| --- | --- | --- | --- |
| As Extruded | 25.85 mm | 0.36 mm | 1.4 |
| Garniture Sized | 25.27 mm | 0.106 mm | 0.42 |
| Rolling Block Sized | 24.82 mm | 0.075 mm | 0.3 |

What is claimed is:

1. A method of sizing thermoplastic polymeric foamed cigarette filter rods which comprises:
    forming a thermoplastic polymeric foamed cigarette filter rod by extrusion through a circular orifice, cutting said rod at a cutting station into sections, each having the length of several filters, conveying said cut sections into the nip formed by a smooth surfaced rotating drum and a plurality of stationary heated block members mounted about and spaced from the periphery of the drum whereby oversized cut sections are rolled and thereby compressed to a uniform circumference.
2. The process of claim 1 wherein said rod is extruded in oversized form.
3. The process of claim 1 wherein said thermoplastic foamed cigarette filters are cellulose acetate foamed cigarette filters.
4. The process of claim 3 wherein the heated block members are heated to temperatures in the range of from 140° C. to 210° C.
5. The process of claim 1 wherein said thermoplastic polymeric foamed cigarette filters are polyolefin foamed cigarette filters.
6. The process of claim 1 wherein said thermoplastic polymeric foamed cigarette filter rod is presized in a garniture belt sizing device prior to being cut.
7. The process according to claim 1 in which said rod sections are conveyed from said cutting station by being fed into and carried by transverse grooves in a belt conveyor.

* * * * *